United States Patent
Fujita et al.

(10) Patent No.: US 9,258,488 B2
(45) Date of Patent: Feb. 9, 2016

(54) CAMERA AND METHOD OF CONTROLLING OPERATION OF SAME

(71) Applicant: FUJIFILM Corporation, Tokyo (JP)

(72) Inventors: Koudai Fujita, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/577,347

(22) Filed: Dec. 19, 2014

(65) Prior Publication Data

US 2015/0103217 A1     Apr. 16, 2015

Related U.S. Application Data

(63) Continuation of application No. PCT/JP2013/064347, filed on May 23, 2013.

(30) Foreign Application Priority Data

Jun. 29, 2012   (JP) .................................. 2012-147635

(51) Int. Cl.
*H04N 5/232* (2006.01)
*G03B 13/06* (2006.01)
(Continued)

(52) U.S. Cl.
CPC ............ *H04N 5/23293* (2013.01); *G03B 13/06* (2013.01); *G03B 17/20* (2013.01); *H04N 5/225* (2013.01); *H04N 5/335* (2013.01)

(58) Field of Classification Search
CPC ................................................ H04N 5/23293
See application file for complete search history.

(56) References Cited

U.S. PATENT DOCUMENTS

2001/0028500 A1 * 10/2001 Koyama ........................ 359/431
2007/0019944 A1 *  1/2007 Ikeda et al. .................... 396/296
(Continued)

FOREIGN PATENT DOCUMENTS

JP       2008-60811 A    3/2008
JP      2008-170872 A    7/2008
(Continued)

OTHER PUBLICATIONS

International Search Report, issued in PCT/JP2013/064347, dated Jul. 2, 2013.
(Continued)

*Primary Examiner* — Twyler Haskins
*Assistant Examiner* — Fayez Bhuiyan
(74) *Attorney, Agent, or Firm* — Birch, Stewart, Kolasch & Birch, LLP (57) ABSTRACT

It is arranged so that the user of a camera will not experience a sense of incongruity when the camera is switched between an optical viewfinder and an electronic viewfinder. When the electronic viewfinder function is set, the image of a subject captured by a solid-state electronic image sensing device is displayed on the display screen of a liquid crystal device and a viewfinder shutter closes. When the optical viewfinder function is set, the viewfinder shutter opens and the image of the subject is not displayed on the liquid crystal device. At the time of a changeover between the electronic viewfinder function and the electronic viewfinder function, the image of the subject being displayed on the liquid crystal device gradually vanishes, or the image of the subject is gradually displayed on the liquid crystal device, while the opening and closing of the viewfinder shutter is tracked. Sudden darkening and sudden brightening at the time of the viewfinder changeover is prevented.

4 Claims, 11 Drawing Sheets

(51) Int. Cl.
*G03B 17/20* (2006.01)
*H04N 5/225* (2006.01)
*H04N 5/335* (2011.01)

(56) References Cited

U.S. PATENT DOCUMENTS

2008/0170150 A1 7/2008 Kojima et al.
2013/0194479 A1* 8/2013 Jogetsu .................. 348/333.08
2014/0002709 A1 1/2014 Sakurabu

FOREIGN PATENT DOCUMENTS

| | | |
|---|---|---|
| JP | 2012-65294 A | 3/2012 |
| JP | 2012-63722 A | 9/2012 |
| WO | WO 2012/035822 A1 | 3/2012 |
| WO | WO 2012/120952 A1 | 9/2012 |

OTHER PUBLICATIONS

Written Opinion of the International Searching Authority, issued in PCT/JP2013/064347, dated Jul. 2, 2013.

* cited by examiner

CAMERA AND METHOD OF CONTROLLING OPERATION OF SAME

CROSS-REFERENCE TO RELATES APPLICATIONS

This application is a Continuation of PCT International Application No. PCT JP2013/064347 filed on May 23, 2013, which claims priority under 35 U.S.C. §119(a) to Japanese Patent Application No. 2012-147635 filed Jun. 29, 2012. Each of the above application(s) is hereby expressly incorporated by reference, in its entirety, into the present application.

BACKGROUND OF THE INVENTION

1. Field of the Invention

This invention relates to a camera and to a method of controlling the operation thereof.

2. Description of the Related Art

An optical/electronic viewfinder that can be switched between an optical viewfinder and an electronic viewfinder is available in the art. In a case where an optical/electronic viewfinder functions as an optical viewfinder, the user can see the optical image of a subject through an objective window, which is formed on the front of the camera, when the user looks at the subject through an eyepiece window. In a case where the optical/electronic viewfinder functions as an electronic viewfinder, the image of a subject obtained by imaging is displayed on a liquid crystal panel and this image is introduced to the eyepiece window by a deflecting device such as a half-mirror and prism or the like. The user looking at the eyepiece window sees the image of the subject being displayed on the liquid crystal panel (Patent Document 1).

The optical/electronic viewfinder is provided with a finder shutter between the deflecting device and the objective window. If a changeover is made from the optical viewfinder to the electronic viewfinder, the finder shutter closes. As a result, the eye of the user looking at the eyepiece window cannot see the subject through the objective window and see the image of the subject displayed on the liquid crystal panel. Conversely, if a changeover is made from the electronic viewfinder to the optical viewfinder, the finder shutter opens and the image of the subject being displayed on the liquid crystal panel vanishes.

In addition to a digital single-lens reflex camera having the above-described optical/electronic viewfinder, there is also one having an electronic viewfinder that shares part of the optical system of an optical viewfinder and makes it possible to observe an electronic image captured by imaging means (Patent Document 2). There is also a single-lens reflex camera that can be switched between observation of a subject from an optical finder and observation of a subject achieved by displaying the image of the subject on a back panel (Patent Document 3). There are other examples as well.

Patent Document 1: Japanese Patent Application Laid-Open No. 2012-63722

Patent Document 2: Japanese Patent Application Laid-Open No. 2008-60811

Patent Document 3: Japanese Patent Application Laid-Open No. 2008-170872

In a case where a changeover is made from the optical viewfinder to the electronic viewfinder in an optical/electronic viewfinder, the interior of the finder suddenly goes dark when the finder shutter suddenly closes. Further, in a case where a changeover is made from the electronic viewfinder to the optical viewfinder, the interior of the finder brightens suddenly when the finder shutter opens. Further, when the image in the electronic viewfinder and the image in the optical viewfinder are superimposed and displayed, a dual image appears and the result will be too bright for the user. When the dual image changes to the image in the electronic viewfinder or to the image in the optical viewfinder, the too-bright image becomes an image that is relatively dark, causing the user to experience flickering. In any case, the user looking at the eyepiece window will experience a sense of incongruity.

SUMMARY OF THE INVENTION

An object of the present invention is to arrange it so that no discomfort is produced when there is a changeover between an optical viewfinder and an electronic viewfinder.

According to the present invention, there is provided a camera comprising: a finder unit formed on the front of the camera and having an objective window facing a subject and an eyepiece window for looking at the subject seen through the objective window; a solid-state electronic image sensing device for imaging the subject and outputting image data representing the image of the subject; a display unit for displaying the image of the subject, which is represented by the image data that has been output from the solid-state electronic image sensing device, on a display screen; a deflecting unit, which is provided between the objective window and the eyepiece window, for introducing the image of the subject, which is being displayed on the display screen of the display unit, to the eyepiece window; a finder shutter, which is provided on the subject-side of the deflecting unit, for blocking light incident from the objective window; and a display control device (display control means) for controlling the display unit so as to follow the finder shutter and gradually display the image of the subject on the display screen when the finder shutter is released, and follow the finder shutter and gradually remove the image of the subject, which is being displayed on the display screen, when the finder shutter is closed.

The present invention also provides an operation control method suited to the above-described camera. Specifically, the present invention provides a method of controlling operation of a camera which includes a finder unit formed on the front of the camera and having an objective window facing a subject and an eyepiece window for looking at the subject seen through the objective window, the method comprising steps of: a solid-state electronic image sensing device imaging the subject and outputting image data representing the image of the subject; a display unit displaying the image of the subject, which is represented by the image data that has been output from the solid-state electronic image sensing device, on a display screen; a deflecting unit, which is provided between the objective window and the eyepiece window, introducing the image of the subject, which is being displayed on the display screen of the display unit, to the eyepiece window; a finder shutter, which is provided on the subject-side of the deflecting unit, blocking light incident from the objective window; and a display control device controlling the display unit so as to follow the finder shutter and gradually display the image of the subject on the display screen when the finder shutter is released, and follow the finder shutter and gradually remove the image of the subject, which is being displayed on the display screen, when the finder shutter is closed.

In accordance with the present invention, when a finder shutter opens, the image of a subject is gradually displayed on a display screen while following up the finder shutter. When the finder shutter closes, the image of the subject being displayed on the display screen is gradually removed from the display screen while following up the finder shutter. Thus the image of the subject being displayed on the display screen is removed gradually, or the image of the subject is displayed gradually on the display screen, following up the opening and closing of the finder shutter. This means that sudden brightening and darkening within the finder is prevented. A user looking at the eyepiece window can be prevented from experiencing a sense of incongruity.

By way of example, the display control device controls the display unit so as to display the image of the subject on the display screen gradually at a speed identical with release speed of the finder shutter when the finder shutter is released, and remove the image of the subject from the display screen gradually at a speed identical with speed at which the finder shutter closes when the finder shutter closes.

By way of example, the display control device controls the display unit so as to display the image of the subject on the display screen gradually in synch with release of the finder shutter, and remove the image of the subject from the display screen gradually in synch with closing of the finder shutter.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
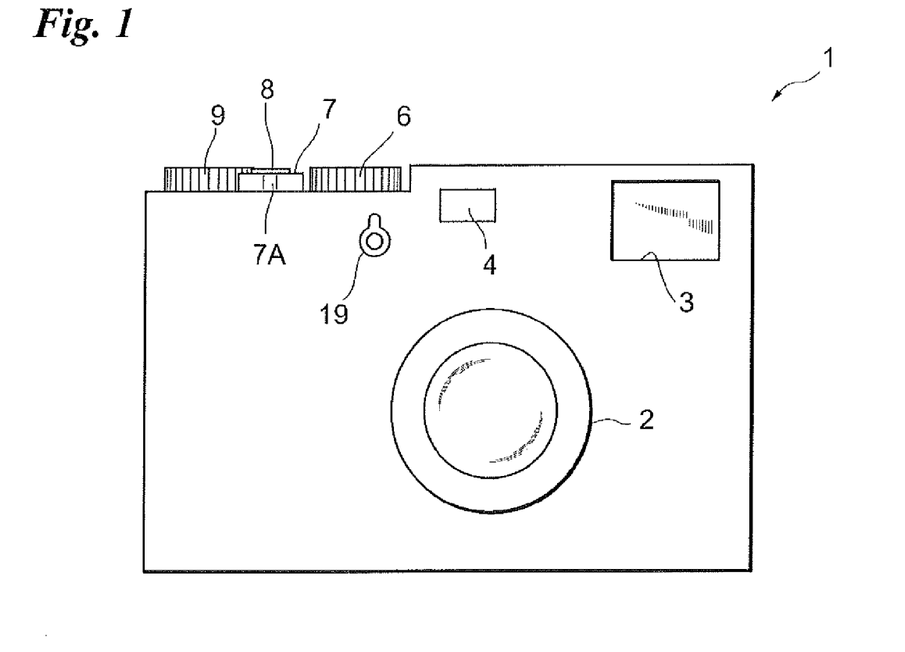
FIG. 1 is a front view of a digital camera.
Figure 2:
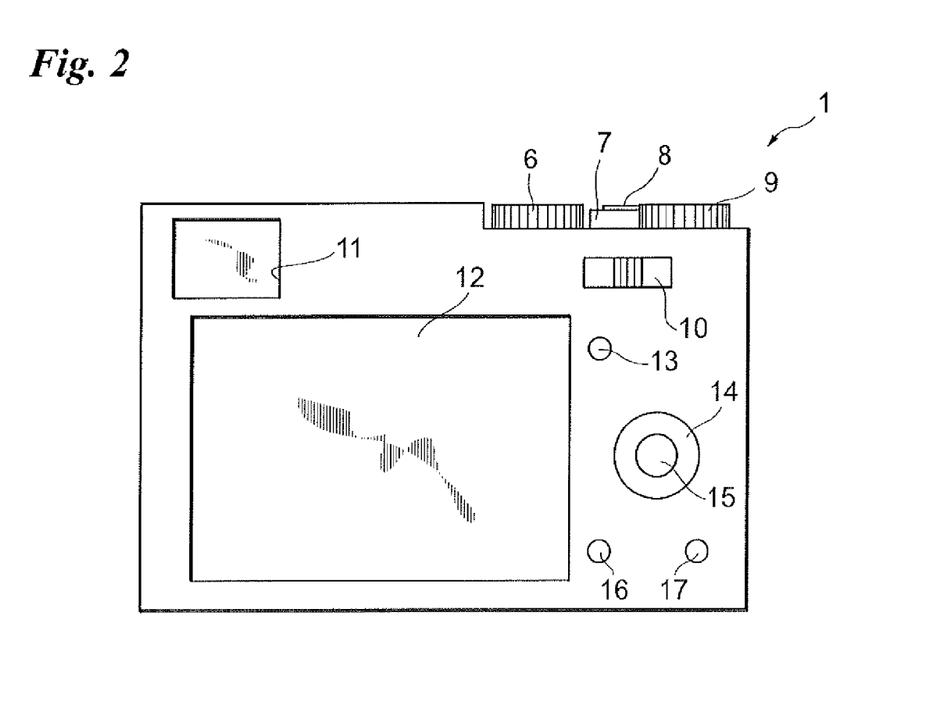
FIG. 2 is a back view of the digital camera.
Figure 3:
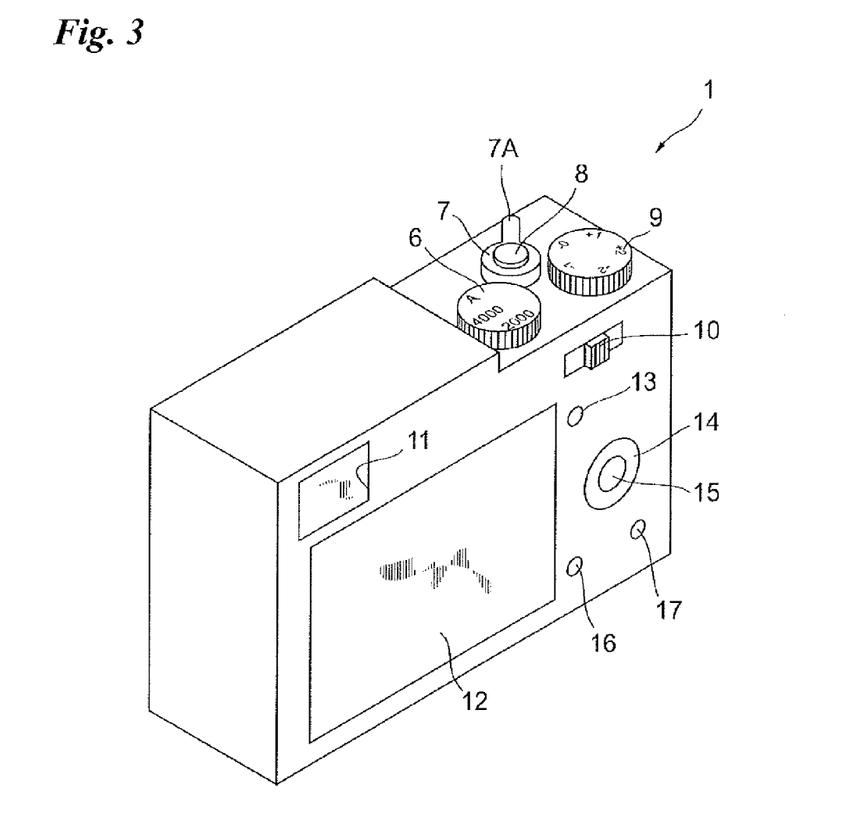
FIG. 3 is a perspective view of the digital camera when viewed from the back.

FIGS. 1 to 3, which illustrate an embodiment of the present invention, show the external appearance of a digital camera 1. FIG. 1 is a front view, FIG. 2 a back view and FIG. 3 a perspective view when viewed from the back.

With reference to FIG. 1, a lens barrel 2 projects forwardly from the approximate center of the front side of the digital camera 1. A finder unit is constructed at the upper right of the digital camera 1 and is formed to include an objective window 3 facing a subject. A flash device 4 is provided on the left side of the objective window 3. As will be described later in greater detail, the finder unit of this embodiment is capable of being switched between an optical viewfinder function and an electronic viewfinder function. To achieve this, a switching lever 19 for switching between the optical viewfinder function and the electronic viewfinder function is provided on the left side of the flash device 4. If the switching lever 19 is tilted leftward when viewed from the front, the finder unit is set to the optical viewfinder function. If the switching lever 19 is tilted rightward when viewed from the front, the finder unit is set to the electronic viewfinder function.

A shutter-speed dial 6, a power lever 7, a shutter-release button 8 and an exposure dial 9 are provided on the top of the digital camera 1 on the left side thereof when viewed from the front. The shutter-speed dial 6 is a circular dial that is free to rotate. By rotating the shutter-speed dial 6, the user can set a desired shutter speed. The power lever 7 can be moved through a prescribed angle rightward and leftward when viewed from the front. By moving the power lever 7 through the prescribed angle, the user can turn the power supply of the digital camera 1 on and off. The power lever 7 has the shape of a ring with an interior space when viewed from the top (see FIG. 3), and the shutter-release button 8 is provided within the space. The exposure dial 9 also is a circular dial that is free to rotate. By turning the exposure dial 9, the user can correct the exposure.

With reference to FIGS. 2 and 3, a liquid crystal display device 12 is provided on the back side of the digital camera 1 substantially over the entirety thereof. An eyepiece window 11 constituting the above-mentioned finder unit is formed on the back side of the digital camera 1 at the upper left thereof. A command lever 10 movable to the left and right is provided on the back side of the digital camera 1 at the upper right thereof. By manipulating the command lever 10, the user can supply the digital camera 1 with a command such as an aperture adjustment command in steps of ⅓ EV when the camera is in the manual exposure mode.

Provided below the command lever 10 are an AF (autofocus)/AE (autoexposure) lock button 13, a command dial 14, a menu/OK button 15, a back button 16 and a RAW button 17, etc.

With reference primarily to FIG. 3, the shutter-speed dial 6, power lever 7, shutter-release button 8 and exposure dial 9 are provided on the top of the digital camera 1 on the right side thereof (the right side when viewed from the back), as mentioned above. The power lever 7 is formed to have a projection 7A projecting toward the front side. The power supply of the digital camera 1 can be turned on and off by grasping the projection 7A and moving it to the right or left.

By bringing an eye close to the eyepiece window 11 of the finder unit and looking at the eyepiece window 11, the user can view a subject through the objective window 3 and eyepiece window 11 and can decide the camera angle.

Figure 4:
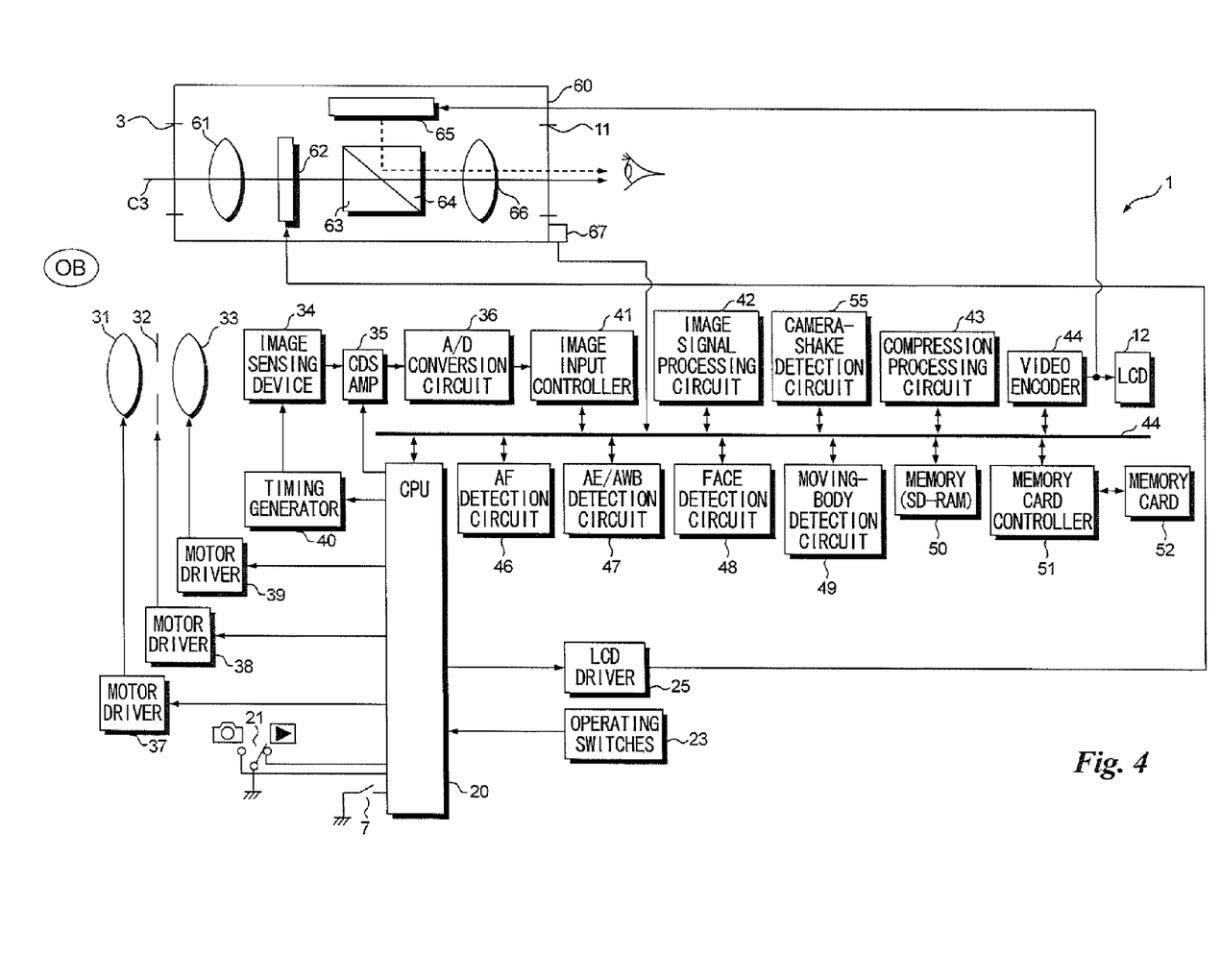
FIG. 4 is a block diagram illustrating the electrical configuration of the digital camera.

FIG. 4 is a block diagram illustrating the electrical configuration of the digital camera 1.

The overall operation of the digital camera 1 is controlled by a CPU 20.

As mentioned above, the digital camera 1 is provided with operating switches 23 such as the shutter-speed dial 6, power lever 7, exposure dial 9 and switching lever 19. Signals from the operating switches 23 are input to the CPU 20. Further, a signal indicating whether the power supply has been turned on or off by the power lever 7 also is input to the CPU 20.

Further, a changeover signal from a changeover switch 21 for switching between a shooting mode and a playback mode also is input to the CPU 20.

The digital camera 1 includes a solid-state electronic image sensing device 34. A zoom lens 31, iris 32 and focusing lens 33 are provided in front of the solid-state electronic image sensing device 34. The zoom lens 31 has its amount of zoom controlled by a motor driver 37, the iris 32 has its aperture value controlled by a motor driver 38, and the focusing lens 33 has its focus position controlled by a motor driver 39.

When the image of a subject is formed on the photoreceptor surface of the solid-state electronic image sensing device 34, the solid-state electronic image sensing device 34 is controlled by a timing generator 40 and a video signal representing the image of the subject is output from the solid-state electronic image sensing device 34. The video signal that has been output from the solid-state electronic image sensing device 34 is subjected to correlated double sampling in a CDS (Correlated Double Sampling) amplifier circuit 35. The CDS amplifier circuit 35 outputs the resultant video signal, which is converted to digital image data in an analog/digital conversion circuit 36.

The digital image data is input to an AF (autofocus) detection circuit 46 via an image input controller 41. A focusing control signal is generated based upon the entered digital image data, and the focusing control signal generated is input to the CPU 20. The motor driver 39 is controlled based upon the focusing control signal so that the focusing lens 33 is positioned. The AF detection circuit 46 calculates the distance to a principal subject, which is specified by an AF target frame 94, described later. If necessary, the digital camera 1 would be provided with a rangefinding device for measuring the distance to the principal subject. Further, the digital image data that has been output from the image input controller 41 is input to an AE (autoexposure)/AWB (automatic white balance) 47 as well. The AE/AWB detection circuit 47 generates an exposure control signal and a white balance adjustment signal. The exposure control signal generated is input to the CPU 20. The motor driver 38 is controlled based upon the exposure control signal, whereby the aperture value of the iris 32 is controlled. Further, the white balance adjustment signal generated in the AE/AWB detection circuit 47 is input to an image signal processing circuit 42. Image data that has been output from image input controller 41 also is input to the image signal processing circuit 42 as well. The image signal processing circuit 42 subjects the image data to a white balance adjustment based upon the white balance adjustment signal.

Image data that has been output from the image signal processing circuit 42 is applied to a liquid crystal display device 12 via a video encoder 44. The captured image of the subject is displayed on the display screen of the liquid crystal display device 12.

As mentioned above, the digital camera includes a finder unit 60.

The finder unit 60 has an eyepiece lens 66 provided in front of the eyepiece window 11. A prism 63 formed to have a half-mirror 64 is provided in front of the eyepiece lens 66. The half-mirror 64 is formed so as to have a 45-degree angle of incidence with respect to optical axis C3 of the finder unit 60. A viewfinder shutter (which may be a mechanical shutter or a liquid crystal shutter) 62 and an objective lens 61 are provided in front of the prism 63. The finder unit 60 is further provided with a liquid crystal device 65. Data representing various information and the like that are output from the video encoder 44 are input to the liquid crystal device 65, where this information and the like are displayed.

When the electronic viewfinder function is set by the switching lever 19, the viewfinder shutter 62 gradually closes. Since the light rays representing the optical image of the subject that have passed through the objective window 3 are blocked when the viewfinder shutter 62 has closed, the user cannot see the optical image of the subject through the eyepiece window 11. When the viewfinder shutter 62 has closed, image data obtained by imaging is input to the liquid crystal device 65. Accordingly, the image of the subject obtained by imaging is displayed on the display screen of the liquid crystal device 65. The image of the subject displayed on the display screen of the liquid crystal device 65 is seen by the user through the eyepiece window 11.

When the optical viewfinder function is set by the switching lever 19, the viewfinder shutter 62, which was closed, gradually opens. The image of a subject OB formed by the objective lens 61 and eyepiece lens 66 can be seen through the eyepiece window 11. In a case where the optical viewfinder function has been set, data representing information such as a visual-field frame is applied to the liquid crystal device 65, as described later; data representing the image of the subject obtained by imaging is not applied to the liquid crystal device 65. Since the information such as the visual-field frame is displayed on the display screen of the liquid crystal device 65, the user can see the optical image of the subject on which is superimposed information such as the visual-field frame being displayed on the display screen of the liquid crystal device 65, in which the light rays representing these items of information are reflected by the half-mirror 64.

In particular, in this embodiment, the liquid crystal device 65 is controlled in such a manner that the image of the subject is displayed on the display screen gradually or is removed gradually in synch with the opening and closing of the viewfinder shutter 62 (at a speed identical with the opening/closing speed). Since the image of the subject is not suddenly displayed on and suddenly removed from the display screen of the liquid crystal device 65 in response to changeover between the optical viewfinder function and the electronic viewfinder function, there is no sudden brightening or sudden darkening in the eyepiece window 11. The user will not sense any incongruity when the changeover is made between the optical viewfinder function and the electronic viewfinder function.

An eye sensor 67 is mounted in the vicinity of the eyepiece window 11. The eye sensor 67 detects that the eye of user has been brought near the eyepiece window 11, whereupon the viewfinder shutter 62 opens so that the optical image of the subject OB can be viewed through the eyepiece window 11. If the eye sensor 67 has not detected that the eye of the user has been brought near the eyepiece window 11, the viewfinder shutter 62 closes. The image of the subject is displayed on the liquid crystal device 65 and the user decides the camera angle while viewing the image of the subject being displayed on the liquid crystal device 65. Even if the eye sensor 67 has detected that the eye of the user has been brought near the eyepiece window 11, the viewfinder shutter 62 can be turned off, image data representing the image of the subject can be input to the liquid crystal device 65, and the image of the subject displayed on the liquid crystal device 65 can be viewed through the eyepiece window 11.

The digital camera 1 further includes such circuits as a face detection circuit 48, a moving-body detection circuit 49, and a camera-shake detection circuit 55. The camera-shake detection circuit 55 is a circuit for detecting whether the digital camera 1 is being shaken.

When the shutter-release button 8 is pressed, image data that has been output from the image signal processing circuit 42 as described above is stored temporarily in a memory 50. The image data is read out of the memory 50 and is input to a compression processing circuit 43, which proceeds to execute prescribed compression processing. The compressed image data is applied to and stored temporarily in the memory 50. The compressed image data is read out of the memory 50 and is recorded on a memory card 52 by a memory card controller 51.

When the playback mode is set, image data that has been recorded on the memory card 52 is read out and the image represented by the read image data is displayed on the display screen of the liquid crystal device 12.

Furthermore, image data representing information and data representing various information, which items of data are be displayed on the liquid crystal device 65, also have been stored in the memory 50. By reading out these items of data and applying them to the liquid crystal device 65 via the video encoder 44, various information is displayed on the display screen of the liquid crystal device 65.

Figure 5:
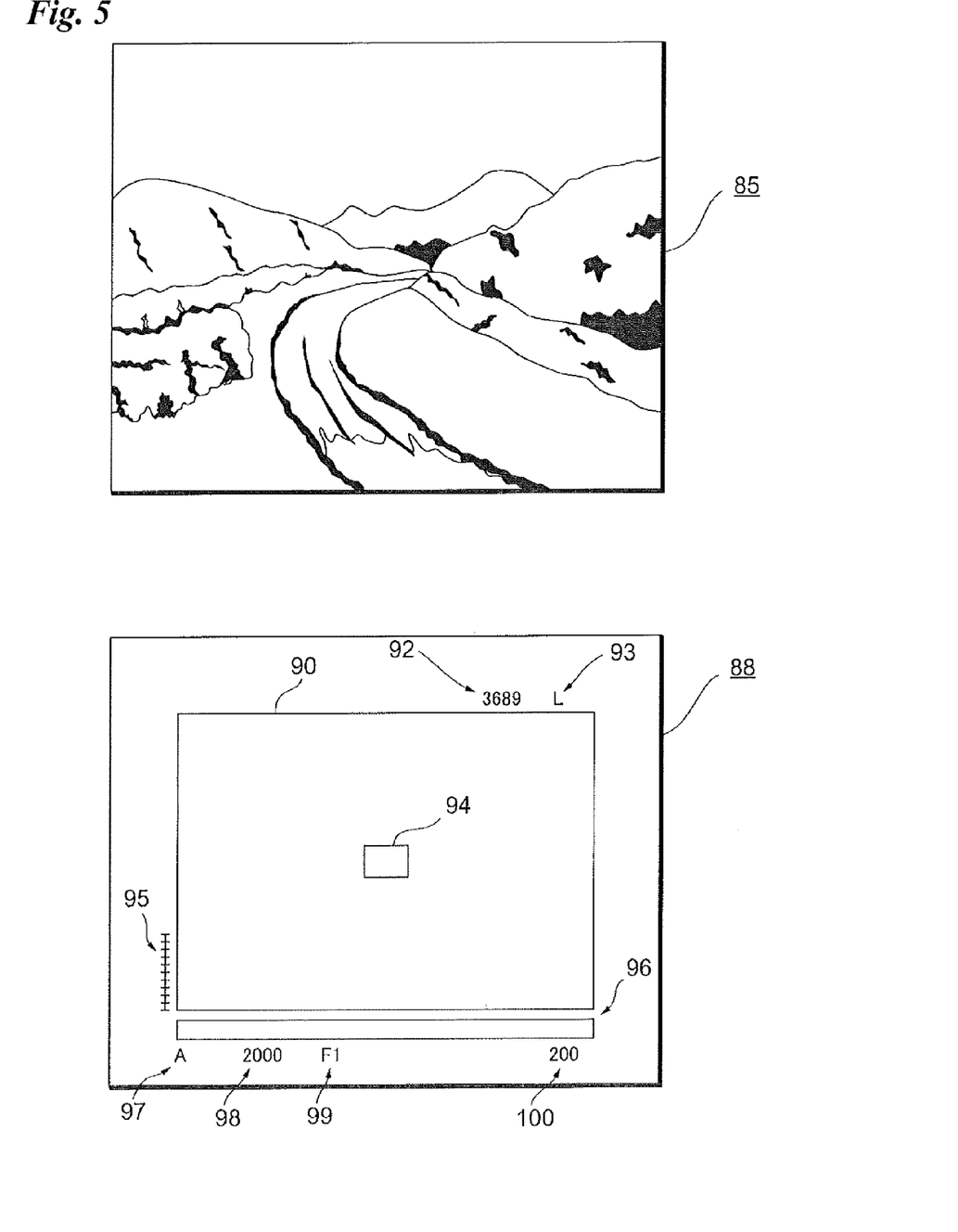
FIG. 5 is an example of an optical image of a subject and an example of information displayed on a liquid crystal display device.

An example of an optical image 85 of a subject is shown at the top of FIG. 5.

When the eye of the user is brought near the eyepiece window 11, the optical viewfinder function is set by the switching lever 19 and the viewfinder shutter 62 opens, as mentioned above, the user sees the optical subject image 85 formed by the objective lens 61 and eyepiece lens 66.

An example of an image 88 displayed on the liquid crystal device 65 is shown at the bottom of FIG. 5.

When the eye of the user is brought near the eyepiece window 11, this is sensed by the eye sensor 67. If the optical viewfinder function has been set, the image 88 shown at the bottom of FIG. 5 is displayed on the display screen of the liquid crystal device 65.

A visual-field frame 90 is formed on the image 88. Numerals 92 indicating the number of photos that can be taken and a character 93 indicating image size are being displayed at the upper right of the visual-field frame 90. Further, an AF target mark 94 is being displayed at the center of the visual-field frame 90. An exposure correction bar 95 is being displayed at the lower left of the visual-field frame 90. Furthermore, a depth-of-field display bar 96, a character 97 indicative of exposure mode, shutter speed 98, aperture value 99 and ISO sensitivity 100 are being displayed below the visual-field frame 90.

Figure 6:
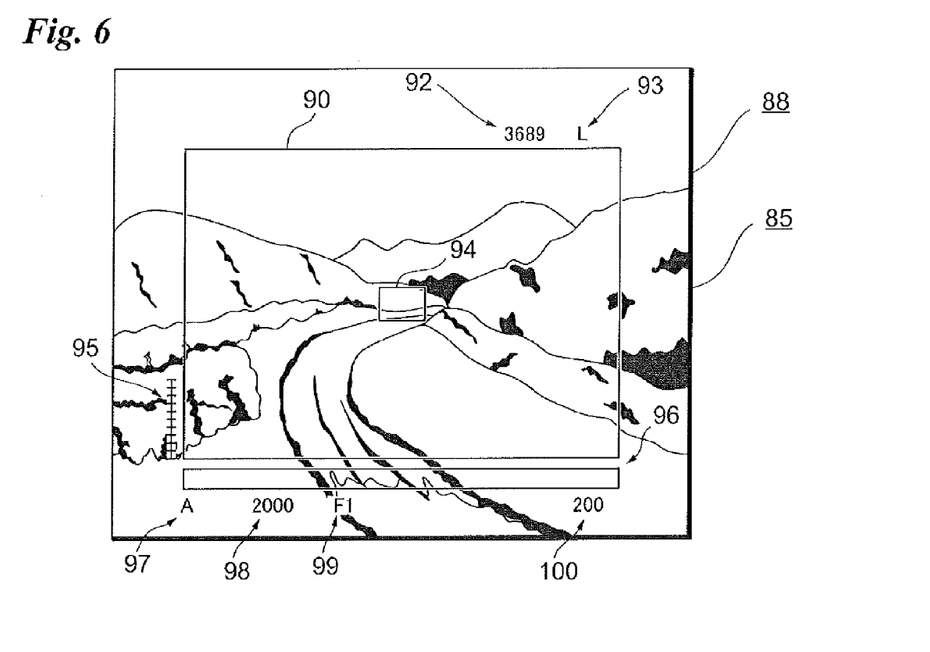
FIG. 6 is an image seen by a user when an optical viewfinder function has been set.

FIG. 6 is an example of an image seen by the user in a case where the optical viewfinder function has been set. This image is the result of superimposing the image displayed on the liquid crystal device 65, shown at the bottom of FIG. 5, on the optical image 85 shown at the top of FIG. 5.

Light rays representing information such as the visual-field frame 90 displayed on the liquid crystal device 65 reach the eye of the user, who is looking at the eyepiece window 11, owing to the half-mirror 64. If the optical viewfinder function has been set, therefore, the user can see an image that is the result of superimposing the information such as the visual-field frame 90, which is being displayed on the liquid crystal device 65, on the optical image 85 representing the image of the subject, as described above.

Figure 7:
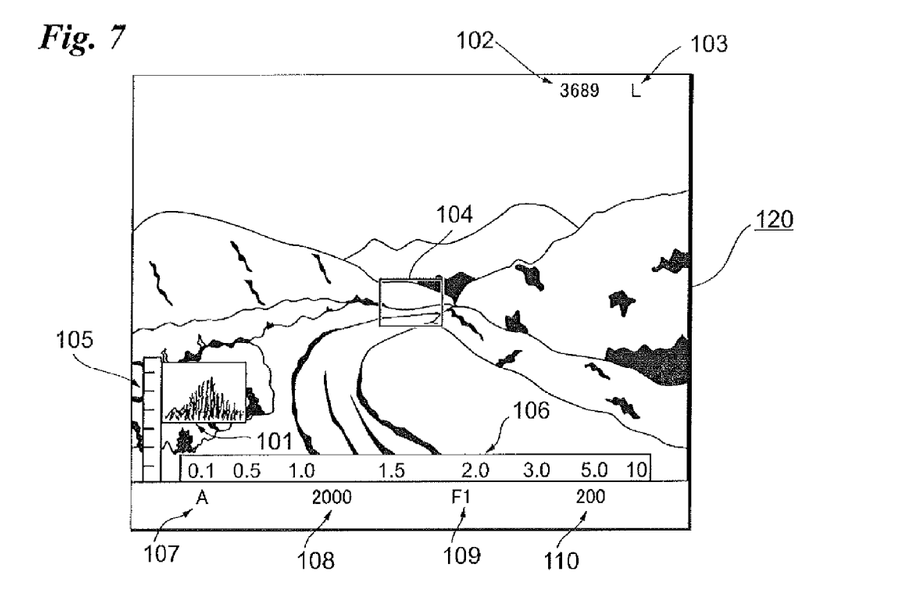
FIG. 7 is an image seen by a user when an electronic viewfinder function has been set.

FIG. 7 is an example of an image 120 seen by the user in a case where the electronic viewfinder function has been set.

When the optical viewfinder function is set, the viewfinder shutter 62 closes and the image 120 shown in FIG. 7 is displayed on the display screen of the liquid crystal device 65. The image 120 is one captured by the solid-state electronic image sensing device 34, as described above. If the viewfinder shutter 62 has closed, the image being displayed on the display screen of the liquid crystal device 65 can be seen by the user looking at the eyepiece window 11.

The image 120 being displayed on the display screen of the liquid crystal device 65 corresponds to the image within the visual-field frame 90, as shown in FIG. 6. Numerals 102 indicating the number of photos that can be taken and a character 103 indicating image size are being displayed at the upper right of the image 120. Further, an AF target mark 104 is being displayed at the center of the image 120. An exposure correction bar 105 also is being displayed at the lower left of the image 120. A histogram 101 of the image 120 also is being displayed on the right side of the exposure correction bar 105. Furthermore, a depth-of-field display bar 106, a character 107 indicative of exposure mode, shutter speed 108, aperture value 109 and ISO sensitivity 110 are being displayed below the image 120.

Figure 8:
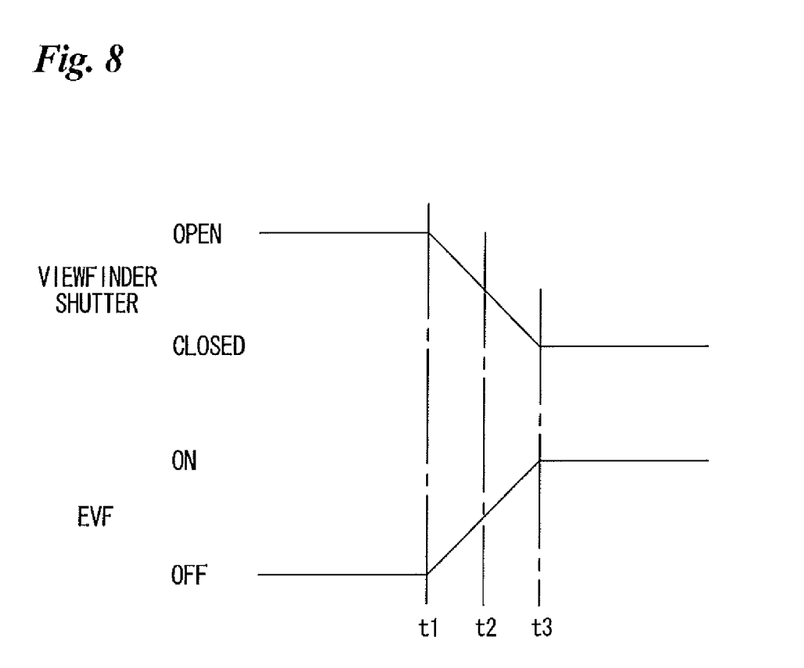
FIG. 8 is a time chart when a changeover is made from the optical viewfinder function to the electronic viewfinder function.

FIG. 8 is a time chart for when the finder unit 60 is switched from the optical viewfinder function to the electronic viewfinder function by the switching lever 19.

Assume that the optical viewfinder function is in the set state up until time t1 and that, at time t1, the switching lever 19 is manipulated to switch from the optical viewfinder function to the electronic viewfinder function. Up until time t1, the viewfinder shutter 62 is open and the electronic viewfinder function is off. Prescribed data such as the visual-field frame 90 is being applied to the liquid crystal device 65, but no image data representing the image of a subject is being applied to the liquid crystal device 65. Accordingly, the user sees the image 88, which is the result of superimposing information such as the visual-field frame 90 onto the optical subject image 85, as shown in FIG. 6.

When time t1 arrives and the optical viewfinder function is changed over to the electronic viewfinder function by the switching lever 19, the viewfinder shutter 62 starts closing gradually from bottom to top. When time t2 arrives, the viewfinder shutter 62 is closed approximately halfway.

Figure 9:
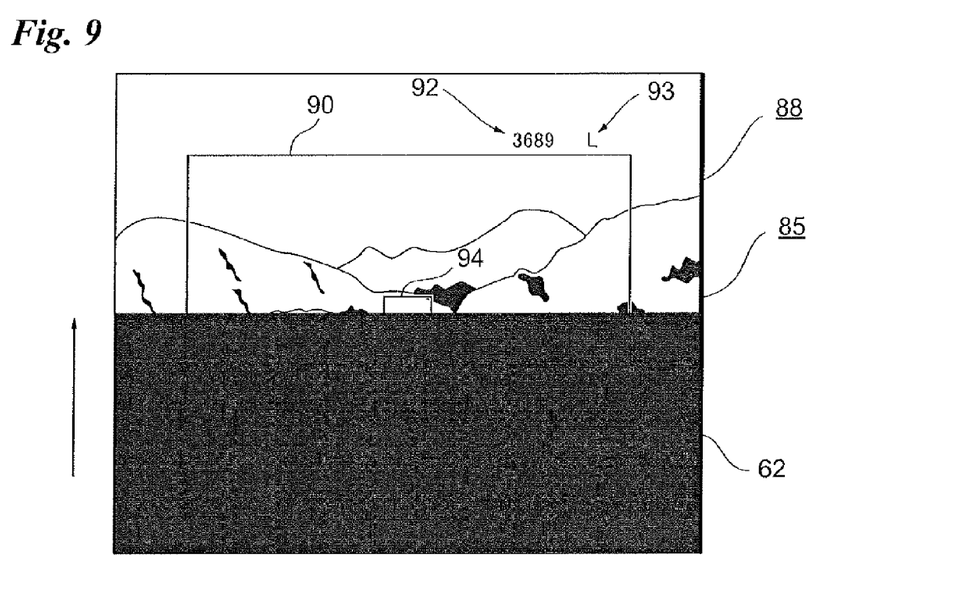
FIG. 9 is an example of an optical image of a subject when a shutter is closing.

FIG. 9 shows how the viewfinder shutter 62 is closed halfway at time t2.

When the viewfinder shutter 62 closes from bottom to top, the subject can no longer be seen through the objective window 3 unless the image of the subject is displayed on the display screen of the liquid crystal device 65. The user, therefore, sees the shutter 62, which is in the process of closing, and the optical subject image 85 on which the shutter 62 has not yet closed. (In this embodiment, the subject image being displayed on the liquid crystal device 65 can be seen on the portion of the shutter 62 that is closing.)

With reference to FIG. 8, when the optical viewfinder function is switched to the electronic viewfinder function by the switching lever 19 at time t1, the optical viewfinder function, which has been off until this point, gradually turns on. When this occurs, the image of the subject captured by the solid-state electronic image sensing device 34 is gradually displayed on the display screen of the liquid crystal device 65 from bottom to top.

Figure 10:
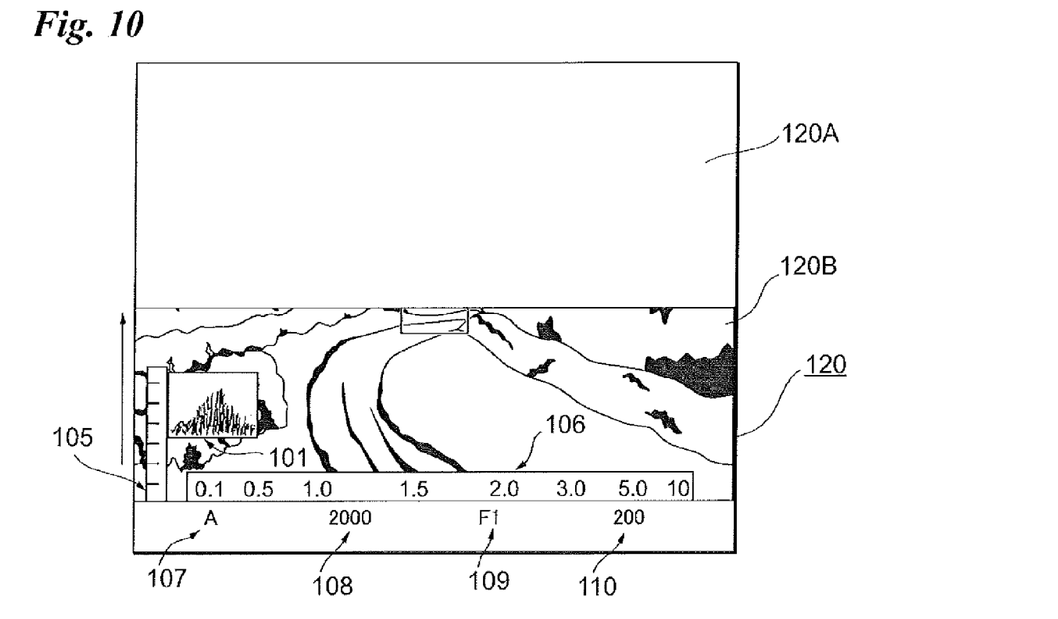
FIG. 10 is an example of an optical image of a subject displayed on a liquid crystal display device when a shutter is closing.

FIG. 10 illustrates the appearance of the display screen of the liquid crystal device 65 at time t2.

When the image of the subject is gradually displayed on the display screen of the liquid crystal device 65 from bottom to top, as described above, at time t2 the image of the subject is displayed in an area 120B, which is the lower-half portion, and the image of the subject is displayed in an area 120A, which is the upper-half portion. (Although information other than the subject image, such as the visual-field frame 90, is displayed in the area 120A constituting the upper half, this information is not shown in FIG. 10 in order to facilitate understanding.) With the passage of time, the proportion of the subject image displayed on the display screen of the liquid crystal device 65 gradually increases. The speed of display of the subject image the proportion of which displayed on the display screen of the liquid crystal device 65 increases is identical with the speed at which the viewfinder shutter 62 closes, as shown in FIG. 9. (Naturally, the display speed need not necessarily be the same as the shutter closing speed; it will suffice if display speed tracks the speed at which the shutter 62 closes.) What the user sees through the eyepiece window 11 is a gradual changeover from the optically formed subject image 85 to the subject image 120 obtained by image capture.

Figure 11:
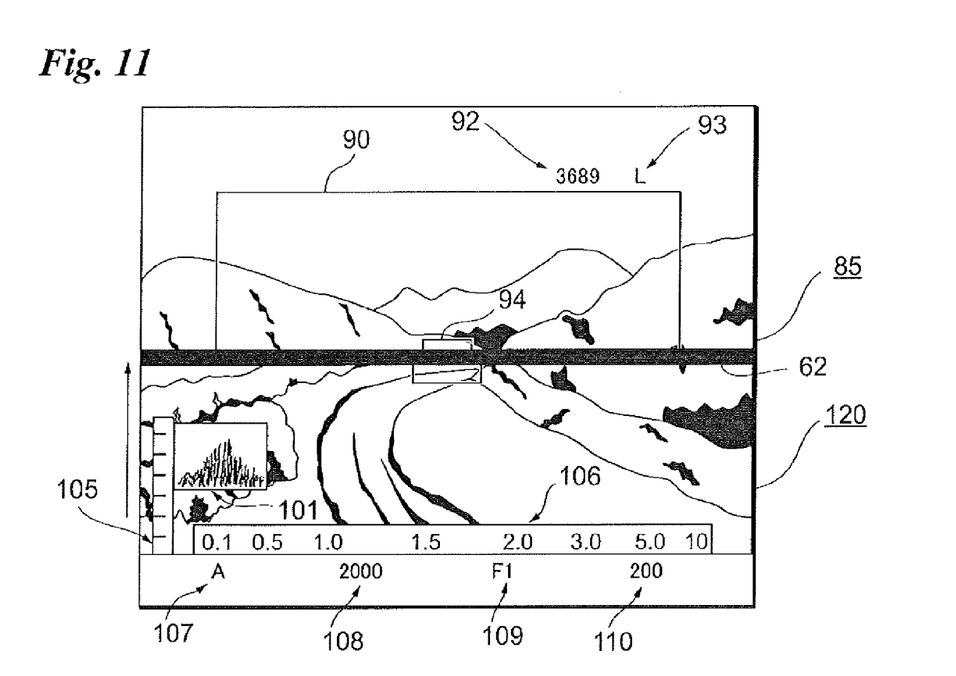
FIG. 11 is an example of an image when seen through an eyepiece window of a finder unit when a shutter is closing.

FIG. 11 is an example of an image seen by the user looking through the eyepiece window 11 at the time of the changeover from the optical viewfinder function to the electronic viewfinder function.

At time t2, the viewfinder shutter 62 shields the area of the lower-half portion of objective window 3 (see FIG. 9), as described above, and the subject image 120 is displayed on the display screen of the liquid crystal device 65 that corresponds to this area (see FIG. 10). Accordingly, the user sees the image 120 the lower-half portion of which is being displayed on the liquid crystal device 65, and sees the optical image of the subject the upper-half portion of which is visible through the objective window 3. The shutter 62 appears at the boundary between the upper- and lower-half portions.

The viewfinder shutter 62 gradually rises toward the top, the area shielded by the viewfinder shutter 62 grows larger and the area of the subject image 120 displayed on the display screen of the liquid crystal device 65 also grows in size so as to follow up the closing viewfinder shutter 62 in the direction of closure thereof. The image viewed through the eyepiece window 11 gradually changes over from the optical image of the subject to the captured image of the subject while the closing of the viewfinder shutter 62 is followed up.

If, when the changeover from the optical viewfinder function to the electronic viewfinder function is made, the viewfinder shutter 62 closes instantly and the image of the subject obtained by image capture is then displayed on the display screen of the liquid crystal device 65, the user would see the closed viewfinder shutter 62 and for an instant would see darkness. According to this embodiment, the image of the subject obtained by image capture is displayed on the display screen of the liquid crystal device 65 gradually while the closing of the viewfinder shutter 62 is followed up. As a result, the user does see darkening produced by the closing of the viewfinder shutter 62.

With reference again to FIG. 8, when time t3 arrives, the viewfinder shutter 62 closes completely and the electronic viewfinder function turns on fully. The user looking through the eyepiece window 11 sees the subject image 120 that is being displayed on the liquid crystal device 65, as shown in FIG. 7.

Figure 12:
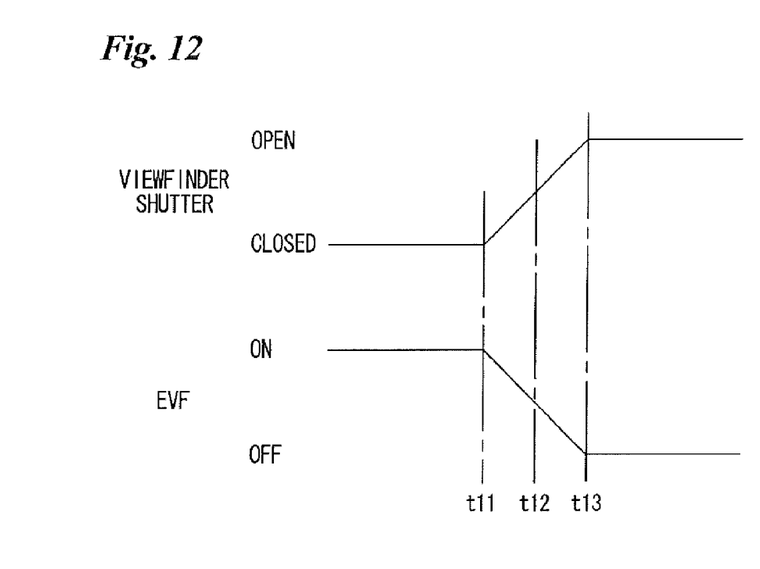
FIG. 12 is a time chart when a changeover is made from the optical viewfinder function to the electronic viewfinder function.

FIG. 12 is a time chart for when a changeover is made from the electronic viewfinder function to the optical viewfinder function by the switching lever 19.

Assume that the electronic viewfinder function is in the set state up until time t11 and that, at time t11, the switching lever 19 is manipulated to switch from the electronic viewfinder function to the optical viewfinder function. Up until time t11, the viewfinder shutter 62 is closed and the electronic viewfinder function is on. Image data representing the image of the subject is being applied to the liquid crystal device 65 and the user looking at the eyepiece window 11 sees the subject image 120 being displayed on the display screen of the liquid crystal device 65.

When time t12 arrives and the electronic viewfinder function is changed over to the optical viewfinder function by the switching lever 19, the viewfinder shutter 62 starts opening gradually from top to bottom. When time t12 arrives, the viewfinder shutter 62 is closed approximately halfway.

Owing to gradual opening of the viewfinder shutter 62 from top to bottom, the subject seen through the objective window 3 gradually grows larger. Further, the subject image 120 being displayed on the liquid crystal device 65 gradually vanishes from top to bottom while the closing of the viewfinder shutter 62 from top to bottom is followed up. The user looking through the eyepiece window 11 sees the optical image of the subject, which can be seen through the objective window 3, this image gradually replacing the subject image 120 being displayed on the liquid crystal device 65.

When the viewfinder shutter 62 opens fully at arrival of time t13, image data representing the image of the subject is no longer applied to the liquid crystal device 65. The user looking through the eyepiece window 11 sees the optical subject image 85, as shown in FIG. 6.

In the case where the electronic viewfinder function is changed over to the optical viewfinder function, the viewfinder shutter 62 gradually descends from top to bottom and the subject image 120 being displayed on the display screen of the liquid crystal device 65 gradually vanishes from top to bottom so as to follow up the opening of the viewfinder shutter 62 in the direction of opening thereof. (The vanishing speed may be identical with the speed at which the shutter 62 opens; a different speed will suffice so long as the opening of the shutter 62 is followed up.) The image viewed through the eyepiece window 11 gradually changes over from the captured image of the subject to the optical image of the subject while the opening of viewfinder shutter 62 is tracked.

If, when the changeover from the electronic viewfinder function to the optical viewfinder function is made, the viewfinder shutter 62 opens instantly, the user sees, through the eyepiece window 11, an image that is the result of superimposing the optical subject image obtained via the objective window 3 and the subject image being displayed on the liquid crystal device 65. The user therefore sees an extremely bright subject image. According to this embodiment, the subject image being displayed on the display screen of the liquid crystal device 65 gradually vanishes while the opening of the viewfinder shutter 62 is followed up. As a result, the user does not see an image that is the result of superimposing the optical subject image and the subject image being displayed on the liquid crystal device 65.

With reference again to FIG. 12, when time t3 arrives, the viewfinder shutter 62 opens fully and the electronic viewfinder function turns off completely. The user looking through the eyepiece window 11 sees the optical subject image 85 obtained via the objective window 3, as shown in FIG. 6.

Figure 13:
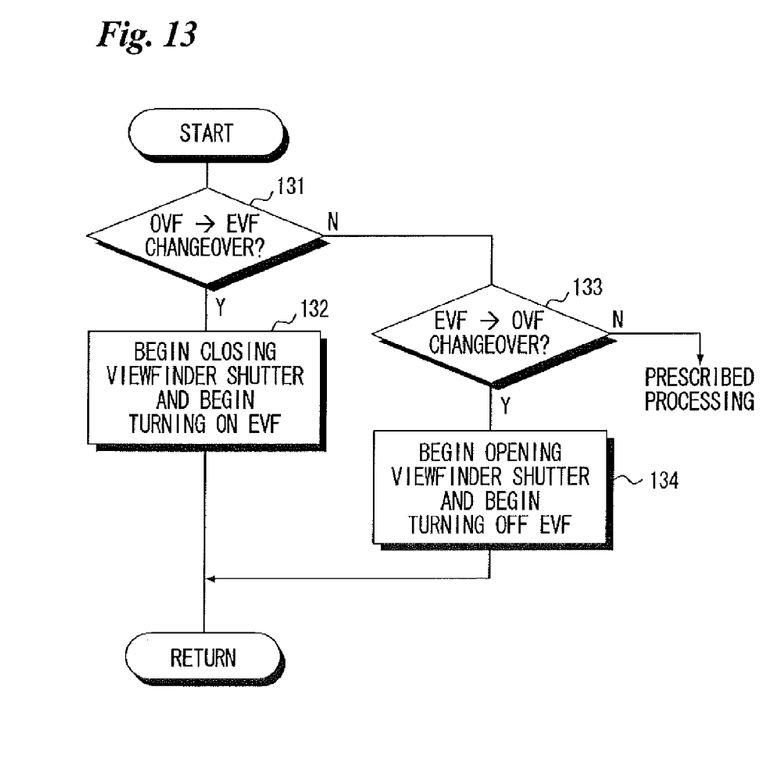
FIG. 13 is a flowchart illustrating processing executed when switching between the optical viewfinder function and the electronic viewfinder function.

FIG. 13 is a flowchart illustrating processing executed when switching between the electronic viewfinder function and the optical viewfinder function.

When the optical viewfinder (OVF) function is changed over to the electronic viewfinder (EVF) function ("YES" at step 131), the viewfinder shutter 62, which has been open, closes gradually and the electronic viewfinder starts opening gradually (step 132). As described above, the image of the subject is gradually displayed on the display screen of the liquid crystal device 65 while the gradual closing of the viewfinder shutter 62 is followed up.

When the electronic viewfinder function is switched to the optical viewfinder function ("YES" at step 133), the viewfinder shutter 62, which has been closed, gradually opens and the electronic viewfinder starts turning off gradually (step 134). As described above, the image of the subject being displayed on the display screen of the liquid crystal device 65 gradually vanishes while the gradual opening of the viewfinder shutter 62 is followed up.

In the above-described embodiment, the viewfinder shutter 62 appears at the boundary between the image of the subject being displayed on the display screen of the liquid crystal device 65 and the optical image of the subject at the time of the changeover between the optical viewfinder function and the electronic viewfinder function, as illustrated in FIG. 11. However, it may be arranged so as to display the image of the subject on the display screen of the liquid crystal device 65, or remove the image of the subject being displayed on the display screen of the liquid crystal device 65, while following up (in perfect synchronization) the opening and closing of the viewfinder shutter 62 in such a manner that the viewfinder shutter 62 will not be seen.

Further, in the above-described embodiment, the viewfinder shutter 62 closes owing to movement of the viewfinder shutter 62 from bottom to top. However, it may be arranged so that the viewfinder shutter 62 is closed by top-to-bottom, left-to-right or right-to-left movement. Similarly, it may be arranged so that the viewfinder shutter 62 opens by bottom-to-top, right-to-left or left-to-right movement.

Furthermore, in the above-described embodiment, when the optical viewfinder function has been set, information such as the visual-field frame 90 is displayed and such information is superimposed on the optical viewfinder, as shown at the bottom of FIG. 5. However, it may be arranged so that no such information is displayed on the liquid crystal device 65 in a case where the optical viewfinder function has been set. The user would see only the optical image of the subject that appears through the objective window 3. In such case the image of the subject is displayed on the liquid crystal device 65 in advance. If the optical viewfinder function has been set, it will suffice to gradually turn off the backlight of the liquid crystal device 65 while following up the opening of the viewfinder shutter 62. If the electronic viewfinder function has been set, it will suffice to gradually turn on the backlight of the liquid crystal device 65 while following up the closing of the viewfinder shutter 62.

In the above-described embodiment, if a changeover is made from the optical viewfinder function to the electronic viewfinder function, the viewfinder shutter 62 gradually rises from bottom to top and the subject image 120 is gradually displayed on the display screen of the liquid crystal device 65 so as to follow up the closing of the viewfinder shutter 62 in the direction of closure thereof. However, in a case where the backlight can be lit gradually, it is preferred that the backlight of the liquid crystal device 65 be lit gradually from bottom to top while the closing of the shutter is followed up. Similarly, if a changeover is made from the electronic viewfinder function to the optical viewfinder function, the viewfinder shutter 62 gradually descends from top to bottom and the subject image 120 being displayed on the display screen of the liquid crystal device 65 gradually vanishes from top to bottom so as to follow up the opening of the viewfinder shutter 62 in the direction in which the shutter opens. However, in a case where the backlight can be extinguished gradually, it is preferred that the backlight of the liquid crystal device 65 also be extinguished gradually from top to bottom while the opening of the shutter 62 is followed up. Since the extinguishment and lighting of the backlight of liquid crystal device 65 is carried out following up the opening and closing of the viewfinder shutter 62, there is an improvement in appearance. In the above-described example, the backlight is lit and extinguished gradually. However, the backlight may be lit and the entirety of the subject image brightened all at once in response to opening of the viewfinder shutter 62, and the backlight may be extinguished and the entirety of the subject image darkened all at once in response to closure of the viewfinder shutter 62.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
   a finder unit formed on the front of the camera and having an objective window facing a subject and an eyepiece window for looking at the subject seen through the objective window;
   a solid-state electronic image sensing device for imaging the subject and outputting image data representing the image of the subject;
   a display unit for displaying the image of the subject, which is represented by the image data that has been output from said solid-state electronic image sensing device, on a display screen;
   a deflecting unit, which is provided between the objective window and the eyepiece window, for introducing the image of the subject, which is being displayed on the display screen of said display unit, to the eyepiece window;
   a finder shutter, which is provided on the subject-side of the deflecting unit, for blocking light incident from the objective window, said finder shutter being controllable to open gradually and to close gradually; and
   a display control device for controlling said display unit so as to gradually display the image of the subject on the display screen while said finder shutter is gradually closing in such manner that the portion of the image of the subject displayed increases at a same rate as that at which the finder shutter closes, and gradually remove the image of the subject, which is being-displayed on the display screen, while said finder shutter is gradually opening in such manner that the portion of the image of the subject displayed decreases at a same rate as that at which the finder shutter opens.

2. The camera according to claim 1, wherein said display control device controls said display unit so as to display the image of the subject on the display screen gradually at a speed identical with a speed of said finder shutter when said finder shutter is gradually closing, and remove the image of the subject from the display screen gradually at a speed identical with a speed at which said finder shutter opens when said finder shutter gradually opens.

3. The camera according to claim 1, wherein said display control device controls said display unit so as to display the image of the subject on the display screen gradually in synch with the gradual closing of said finder shutter, and remove the image of the subject from the display screen gradually in synch with the gradual opening of said finder shutter.

4. A method of controlling operation of a camera which includes a finder unit formed on the front of the camera and having an objective window facing a subject and an eyepiece window for looking at the subject seen through the objective window, said method comprising steps of:
   a solid-state electronic image sensing device imaging the subject and outputting image data representing the image of the subject;

a display unit displaying the image of the subject, which is represented by the image data that has been output from the solid-state electronic image sensing device, on a display screen;

a deflecting unit, which is provided between the objective window and the eyepiece window, introducing the image of the subject, which is being displayed on the display screen of the display unit, to the eyepiece window;

a finder shutter, which is provided on the subject-side of the deflecting unit, blocking light incident from the objective window, said finder shutter being controllable to open gradually and to close gradually; and a display control device controlling the display unit so as to gradually display the image of the subject on the display screen while the finder shutter is gradually closing in such manner that the portion of the image of the subject displayed increases at a same rate as that at which the finder shutter closes, and gradually remove the image of the subject, which is displayed on the display screen, while the finder shutter is gradually opening in such manner that the portion of the image of the subject displayed decreases at a same rate as that at which the finder shutter opens.

\* \* \* \* \*